United States Patent [19]
Coldren

[11] 4,047,463
[45] Sept. 13, 1977

[54] TENSION INDICATOR

[75] Inventor: Chester P. Coldren, Canton, Ohio

[73] Assignee: Eaton Corporation, Cleveland, Ohio

[21] Appl. No.: 708,446

[22] Filed: July 23, 1976

[51] Int. Cl.² .......................................... F16B 31/02
[52] U.S. Cl. .................. 85/62; 116/114 R; 151/38
[58] Field of Search ............ 85/62, 50 R; 116/114 R; 151/36, 38; 73/88 F

[56] References Cited

U.S. PATENT DOCUMENTS

| 903,109 | 11/1908 | Ross | 151/36 |
| 1,786,503 | 12/1930 | Norwood | 151/38 |
| 3,060,731 | 10/1962 | Adise | 85/62 X |
| 3,133,468 | 5/1964 | Cumming | 85/62 |
| 3,503,430 | 3/1970 | Tsurumoto | 151/38 |
| 3,851,386 | 12/1974 | Ellzey | 85/62 X |

Primary Examiner—Ramon S. Britts
Attorney, Agent, or Firm—Teagno & Toddy

[57] ABSTRACT

A one-piece mechanical device for visually indicating the tension in a monitored bolt, such as a mine bolt or the like, is provided. The device comprises a specially configured spring washer, preferably a helical washer, which is inserted in between the head of the monitored bolt and the surface or backing plate against which the head of the bolt will bear for substantially resilient compression therebetween. The washer is selected with a spring constant such that substantial axial compression of the washer will occur only upon the application of a compressive force in the range of tensile forces to monitored in the monitored bolt. Preferably, the washer will only completely flatten between the bolt head and the bearing plate when the compressive force applied thereto exceeds the predetermined maximum tensile force in the bolt. The two adjacent free ends of the washer carry indicia on the outer wall thereof, such as etched or raised lines, easily seen stripes or the like, which will be axially aligned when the tensile force in the bolt is within predetermined limits. The outer circumferential wall of the bolt is of a substantially constant axial length, greater than the axial length of the remainder of the washer, so that the outer circumference of the washer is always the contact surface with both the bolt head and the bearing surface.

11 Claims, 9 Drawing Figures

TENSION INDICATOR

BACKGROUND OF THE INVENTION

1. Field of the Invention

This invention relates to tension indicating devices in general and in particular relates to devices for visually indicating the tension in mine roof bolts which are also known as mine wall bolts, rock bolts and the like. Mor particularly, this invention relates to a specifically configured helical spring washer for visually indicating the tension in a monitored bolt or the like.

2. Description of the Prior Art

The art of roof bolting in mining tunneling and so on is well-known and widely practiced. It is equally well-known that the efficacy of the system depends upon the maintenance of the tension in the bolts in a predetermined range, that is at less than a predetermined maximum and at greater than a predetermined minimum acceptable tension.

At installation, the use of a torque wrench is some assurance that the bolt is initially in proper tension condition, although even this is not sure because of various imponderables such as variations in the screwthreading and in friction losses. However, even if the initial tension is correct, it will not necessarily remain so. It is noted that the U.S. Department of the Interior, Mine Enforcement and Safety Administration, indicates that the prime cause of accidental deaths in mines is the failure of mine roofs and/or ribs.

It is important from the point of view of safety and the general well-being of the mine that variations in tension outside of a permitted range be quickly detected and corrected. This involves periodic inspection of the bolts, which are usually not easily accessible and often all but invisible. These and other difficulties have detracted from the value of known indicating devices.

The prior art includes several devices for indicating the tension in mine roof bolting. These devices may be seen by reference to U.S. Pat. Nos. 2,464,152; 3,104,645; 3,161,174; 3,169,440; 3,329,058 and 3,948,141. These devices are not totally satisfactory and have not found universal or wide use because they were not passive and easily seen from a distance, they indicated over or under tension only, they were complicated and expensive to produce and/or install and/or they required electronic apparatus. More recent prior art devices have utilized chemical substances which change color as the tension in the bolt changed. These devices have also been found to be less than totally satisfactory as they are relatively expensive to produce and/or the change in color has been somewhat difficult to see.

many of the problems of the prior art devices have been overcome by the device described in applicant's copending U.S. patent application Ser. No. 576,416, filed May 12, 1975, assigned to the assignee of this application and hereby incorporated by reference. However, the device of Ser. No. 576,416, filed May 12, 1975, is not totally satisfactory as it is a three-piece assembly and it may be subject to tampering.

It is noted that at the present time, the most common mine bolt tension testing and monitoring system comprises a highly paid employee who manually tests mine bolts with a torque wrench.

SUMMARY OF THE INVENTION

In accordance with the present invention, the drawbacks of the prior art have been overcome to the extent that a relatively simple and inexpensive one-piece device is provided for visually indicating the tension in a mine roof bolt or the like. The device may be permanently installed for passive monitoring of the bolt as its simple structure will tend to prevent tampering therewith and/or unintentional damage thereto. The device includes indicia on the outer walls of a specially configured spring washer which will axially align only when a compressive force is applied to the washer equal to the desired tensile force in the monitored bolt.

The above is accomplished by providing a spring washer, preferably a helical washer, which is inserted inbetween the head of the bolt and the backing plate, or other member, against which the head will bear as the bolt is tightened. The spring washer will have an axially expanded condition, corresponding to no compression thereon and a flattened fully compressed condition preferably corresponding to the compression exerted thereon by the bolt head and the plate when greater than the predetermined maximum tension is in the bolt. The axially extending outer circumferential wall of the washer is of a substantially constant axial length along the entire circumference thereof and is of a greater axial extension than the remainder of the washer assuring that the outer circumference will be in contact with both the head of the monitored bolt and the bearing surface. This feature is believed to provide for more constant indication. The stripes and/or raised or etched lines are preferably highly visible to allow remote visual checking of the tension in the monitored bolt.

Accordingly, it is an object of the present invention to provide a new and improved device for visually indicating the tension in a mine roof bolt or the like.

Another object of the present invention is to provide a relatively simple and economical one-piece mechanical device for visually indicating if a mine roof bolt or the like is subject to greater than a predetermined maximum tension, less than predetermined minimum acceptable tension, or a tension greater than the predetermined minimum acceptable but less than the predetermined maximum.

These and other objects and advantages of the present invention will become apparent from a reading of the detailed description of the preferred embodiment taken in connection with the attached drawings.

DESCRIPTION OF THE PREFERRED EMBODIMENT

Figure 1:
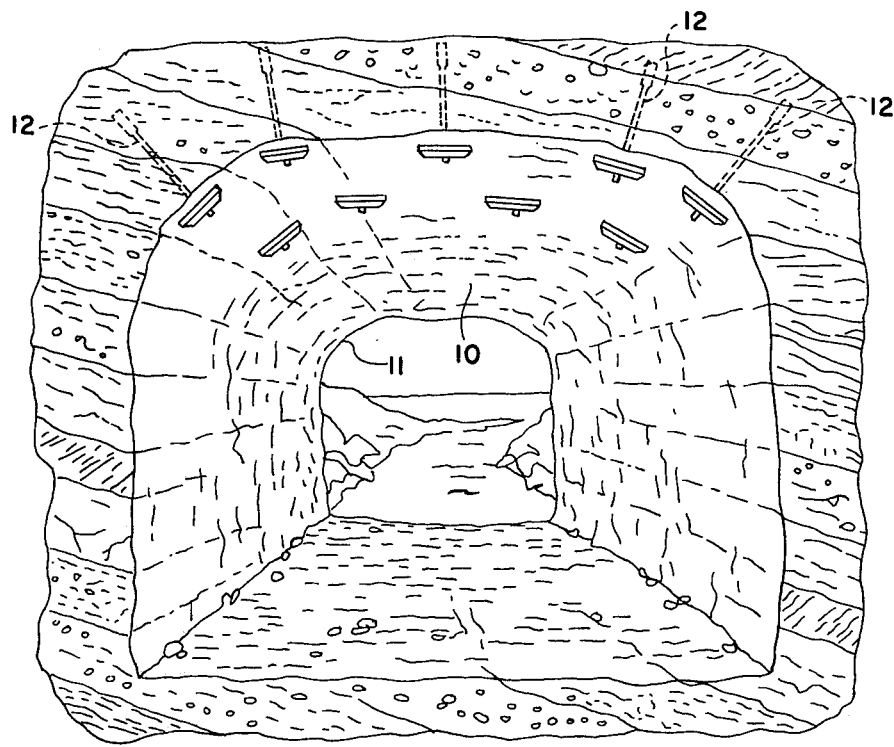
FIG. 1 is a perspective view of a portion of a mine tunnel showing representative "mine roof" or "rock" bolts in position to support the roof.

Referring now to FIG. 1 it will be seen that the roof 10 of a mine tunnel 11 may be supported by a plurality of "rock" or "mine roof" bolts generally bearing the reference character 12. Such bolts are generally ⅝ inch or ¾ inch in diameter and are 3½ feet to 6 feet in length. In order for these rock bolts to adequately peform their task it is necessary that the bolts be tightened to the prescribed tension and that they be maintained at this tension, or within a given tension range, at all times.

Figure 2:
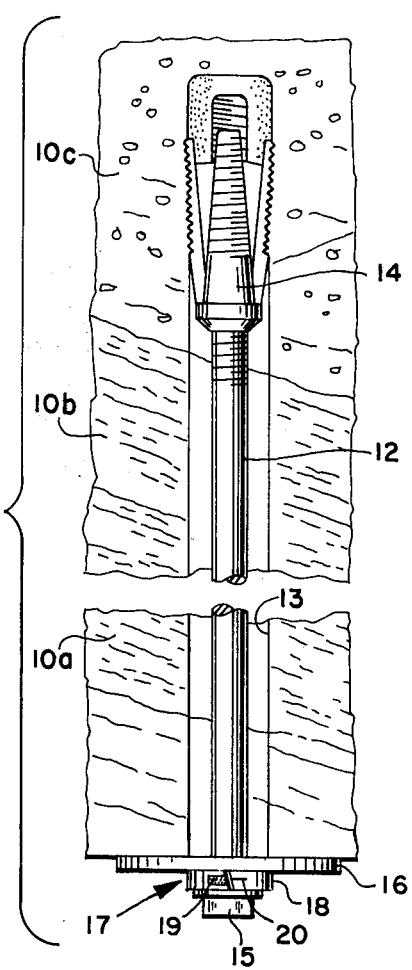
FIG. 2 is an enlarged cross-section showing one of the mine roof or rock bolts of FIG. 1 and illustrating the tension indicating device of the present invention.

In FIG. 2, a typical rock bolt 12 is shown installed in a drilling 13 formed in the rock strata and extending upwardly from the surface of the roof 10. An expansion shell 14 is provided at that end of the rock or mine roof bolt 12 which lies within the drilling 13. The expansion shell 14 may be of any suitable construction and forms no part of the present invention. In general, expansion shells are connected so that as tension is applied to the bolt, the shell will expand radially outwardly to grip the walls of the drilling 13 and to hold the bolt firmly within the drilling. A mine roof backing plate 16 is typically interposed the head 15 of the bolt 12 and the roof 10 of the mine tunnel. Of course, the head 15 of the bolt may be replaced by a threaded end and nut construction as is well-known in the art and the terms "bolt" and "head of the bolt" as used herein are intended to encompass such construction. The indication device 17 of the present invention, to be discussed in greater detail below, is interposed the head 15 of the bolt 12 and the plate 16. It is understood the terms "backing plate" or "plate" will apply to the surface against which the bolt and/or indication device bears. Briefly, the indication device 17 comprises a specially constructed, resilient, spring washer 18 with a specifically positioned pair of indicia lines 19 and 20 on the outer surface of the washer 18. As the head 15 of the bolt 12 is rotatingly advanced towards the expansion shell 14, the bolt 12 will be placed in tension and the rock strata 10a, 10b and 10c constituting the roof 10 will be placed in compression. As this occurs, the spring washer 18 is resiliently compressed, or flattened, between the plate 16 and the head 15 of the bolt 12.

Figure 3:
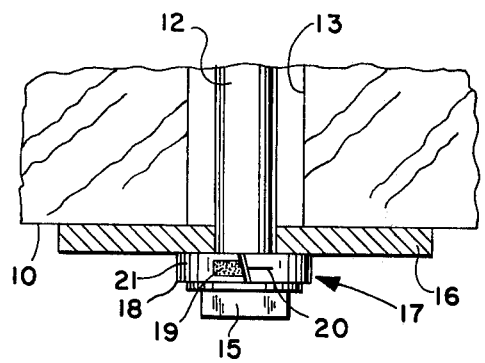
FIG. 3 is an enlarged view of the tension indication device of the present invention.

The tension indication device, 17, of the present invention may be seen in greater detail by reference to FIGS. 3-6. In FIG. 3, the mine roof bolt 12 is shown as received in a drilling 13 in the rock strata and retained by an anchor or expansion member (not shown) of conventional type. A backing plate 16 is utilized to provide a large bearing surface for the bolt against the mine roof 10. The tension indication device 17 is interposed the head 15 of the bolt 12 and the backing plate 16. The indicating device 17 comprises a spring washer 18 and specially positioned pair of indicia lines 19 and 20 which may be seen by reference to FIG. 4. The washer 18 is interposed the head 15 of the bolt 12 and and the backing plate 16. As is well known, the tension in bolt 12 will correspond to the compression between the head 15 of the bolt 12 and the backing plate 16. The spring washer 18 is thus subject to a compression equal to the tension in bolt 12 and a measurement of the compression in the washer 18 will provide an equally accurate measurement of the tension in bolt 12.

Figure 4:
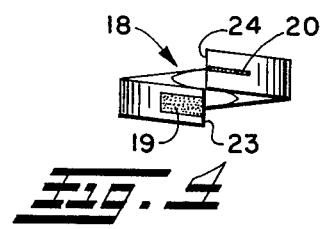
FIG. 4 is a front elevational view of the helical spring washer utilized in connection with the present invention.
Figure 5:
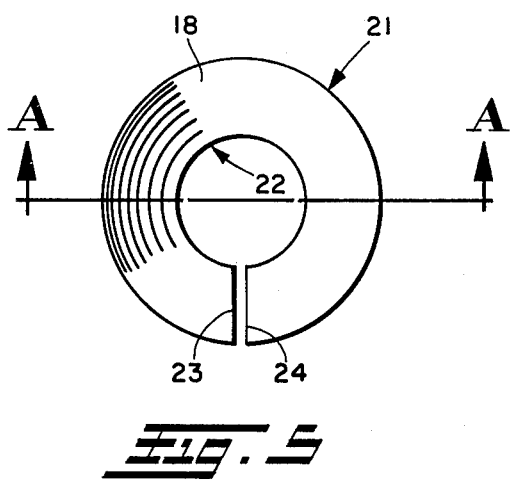
FIG. 5 is a top view of the helical spring washer of the present invention.
Figure 6:
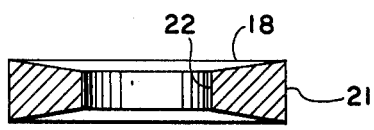
FIG. 6 is a sectional view of the helical spring washer of the present invention taken along line A—A in FIG. 5.
Figure 8:
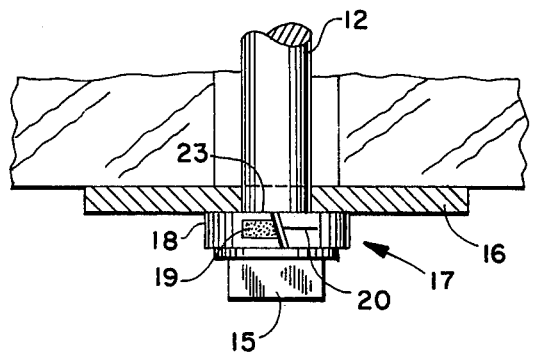
FIG. 8 is an enlarged view of the tension indicating device of the present invention indicating that the tension in a monitored mine roof bolt is greater than the predetermined acceptable minimum but less than the predetermined maximum tension.

The spring washer 18 illustrated is a helical washer having a spring constant which allows the washer to become substantially fully compressed and flattened, FIGS. 3 and 8, upon the application of a compressive force equal to at least the predetermined maximum tension in the bolt 12. It is appreciated that any type of spring washer having sufficient resiliency and spring constant may be utilized. The spring washer in its fully uncoiled, uncompressed condition is illustrated in FIG. 4. The preferred helical spring washer, see FIGS. 4, 5 and 6, is specially configured to be thicker at its outer radius than at its inner radius to present a uniform outer bearing surface against the bolt head 15 and the backing plate 16 may bear. The spring washer is preferably selected with a spring constant such that the washer will be somewhat compressed when subject to a compression equal to the predetermined minimum acceptable tension in the bolt. The axially extending, circumferentially outer wall 21 is of a substantially constant axial length throughout the entire circumference thereof and is of a greater axial length than the circumferentially inner wall 22 or any other portion of the washer 18. The constant axial length outer circumferential wall 21 will thus define the contact surface with both the bolt head 15 and the bearing plate 16. This feature is believed to provide very constant indications of compression in the washer 18 and thus tension in the monitored bolt 12.

As may be seen from FIG. 6, the washer 18 is preferably formed from a single length of metallic material, preferably spring steel, having a generally trapazoidal cross-section, the longer parallel side of the trapazoidal cross-section defining the axially extending outer circumferential wall 21.

On the outer circumferential wall 21, adjacent the free ends 23 and 24 of the washer 18, are the indicia marks 19 and 20. The indicia marks may be raised lines, etched lines, brightly colored painted lines, strips of tape or the like. As the washer 18 is compressed, the free ends 23 and 24 thereof will be forced into axial alignment in a known manner for a known spring constant of the washer. By properly positioning the indicia marks, 19 and 20, on the free ends, 23 and 24, and by properly selecting a washer of a desired spring constant, the axial alignment or misalignment of the indicia marks will provide an accurate visual indication of compressive force on the washer 18 and thus tensile force in the monitored bolt 12.

Figure 7:
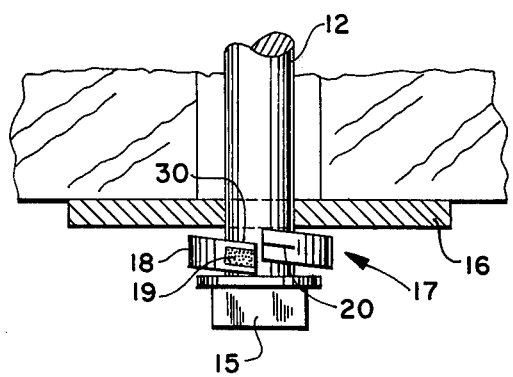
FIG. 7 is an enlarged view of the tension indicating device of the present invention indicating that the tension in a monitored mine roof bolt is less than a predetermined acceptable minimum tension.

By way of example, a relatively narrow indicia mark 20 may be used in connection with a relatively thick indicia mark 19. Thus, the alignment of mark 20 with any portion of mark 19 maybe used to indicate a tensile force in the monitored bolt 12 within a given predetermined range, see FIG. 8. Similarly, misalignment of the indicia marks 19 and 20, see FIG. 7, may be used to indicate tension in the monitored bolt 12 below the predetermined given range. Of course, by proper placement of the indicia marks and selection of spring constant for washer 18, the indicator device may be used to indicate tensile forces in the monitored bolt which are above, below and/or within a predetermined given range.

Of course, various types of known electrical connectors and/or switches may be used in connection with or in place of the indicia marks, 19 and 20, and such devices are intended to fall within the scope of subject invention.

Figure 4A:
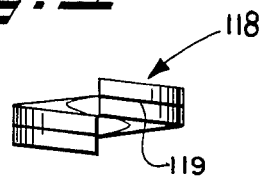
FIG. 4A is a front elevational view of an alternate embodiment of the helical spring washer.

An alternate embodiment of a helical spring washer may be seen by reference to FIG. 4A. In this embodiment the washer 118 is formed from a single length of material of generally trapazoidal cross section having either a raised or etched marking 119 formed along the entire length of the longer parallel wall substantially at the midlength. This allows a long coil or rod of material to simply be sliced to length and then coiled in the helix form and will eliminate the need for a secondary operation to form the indicia marks.

Although this invention has been described in its preferred forms with a certain degree of particularity, it is understood that the present disclosure of the preferred forms is by way of example only and that numerous changes to the details of construction and arrangement of the parts may be resorted to without departing from the spirit and the scope of the invention as hereinafter claimed.

I claim:

1. A one-piece mechanical device for visually indicating if tension in a monitored bolt is within a predetermined range, said device comprising:
a substantially helical spring washer for insertion inbetween the head of the monitored bolt and the surface against which the bolt head exerts a force, said washer having opposed bearing surfaces and having free ends which are opposed but axially spaced apart when the washer is in an uncompressed state, said washer of a spring constant such that the washer will resiliently axially compress over a range of compressive forces exerted thereon equal to the predetermined range of tension in the monitored bolt, the axially extended outer circumferential wall of the washer being of a substantially constant thickness throughout the entire circumference thereof and being of a greater axial extension than the remainder of the washer, the free ends of the outer circumferential walls of the washer carrying indicia marks thereon which are spaced from and substantially centrally located between said opposed bearing surfaces and which will be substantially axially aligned upon the application of an axial compressive force to the washer equal to a tensile force within the given range.

2. The device of claim 1 wherein the washer is formed from an elongated length of metallic material having a generally trapezoidal cross-section, the shorter parallel side in cross-section forming an axially extending inner circumferential wall of the washer and the longer parallel side in cross-section forming the axially extending outer circumferential wall of the washer.

3. The device of claim 2 wherein said axially longer parallel side carries an indicia mark substantially bisecting the longer parallel side along the entire length thereof.

4. The device of claim 2 wherein said material is a spring steel.

5. The device of claim 2 wherein one indicia marking is substantially thicker than the other indicia marking.

6. The device of claim 2 wherein said markings are circumferentially extending etched lines.

7. The device of claim 2 wherein said markings are circumferentially extending raised ribs.

8. The device of claim 5 wherein said markings are of a luminous paint.

9. The device of claim 5 wherein said marks are circumferentially extending strips of luminous tape.

10. A one-piece mechanical device for visually indicating if the tension in a monitored bolt is below, is within and is above a predetermined range, said device comprising a substantially helical spring washer for insertion inbetween the head of the monitored bolt and the bearing surface against which the head of the monitored bolt exerts a force, said washer having opposed bearing surfaces and having ree ends which are opposed but axially spaced apart when the washer is in an uncompressed state, said washer of a spring constant such that compressive forces equal to less than the predetermined range of tensile forces in the monitored bolt will cause only minimal axial compression, compressive forces equal to tensile forces within the predetermined range will cause substantial but not total resilient axial compression and complete axial compression of the washer will occur only upon the application of a compressive force equal to greater than the predetermined range of tensile forces in the monitored bolt; said washer having an axially extending outer circumferential wall of substantially constant axial length, said outer circumferential wall of greater axial length than the remainder of the washer, the free ends of the washer each carrying indicia markings on the outer circumferential wall thereof, said indicia markings being spaced from and substantially centrally located between said opposed bearing surfaces and axially aligning only when the washer axially compresses under a compressive force equal to tensile forces within the predetermined range.

11. The device of claim 10 wherein one of said marks is of considerably greater axial thickness than the other, said washer being formed from a single length of metallic material having a generally trapazoidal crosssection, the longer parallel side of said crosssection defining said outer circumferential wall of said washer.

* * * * *

UNITED STATES PATENT AND TRADEMARK OFFICE
CERTIFICATE OF CORRECTION

PATENT NO. : 4,047,463

DATED : Sept. 13, 1977

INVENTOR(S) : Chester P. Coldren

It is certified that error appears in the above-identified patent and that said Letters Patent are hereby corrected as shown below:

| | |
|---|---|
| Col. 1, line 10: | "specifically" should read "specially". |
| line 53: | "many" should read "Many". |
| Col. 3, line 27: | "connected" should read "constructed". |
| Col. 4, line 42: | "As the washer..." should begin a new paragraph. |

Signed and Sealed this

Sixth Day of December 1977

[SEAL]

Attest:

RUTH C. MASON
*Attesting Officer*

LUTRELLE F. PARKER
*Acting Commissioner of Patents and Trademarks*